(12) United States Patent
Kim

(10) Patent No.: US 9,437,249 B1
(45) Date of Patent: Sep. 6, 2016

(54) OPTICAL DISC DRIVE

(71) Applicant: HITACHI-LG DATA STORAGE KOREA, INC., Seoul (KR)

(72) Inventor: Taehyung Kim, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 0 days.

(21) Appl. No.: 15/016,044

(22) Filed: Feb. 4, 2016

(30) Foreign Application Priority Data

Feb. 25, 2015 (KR) .......................... 10-2015-0026503

(51) Int. Cl.
　　*G11B 7/08*　　　(2006.01)
　　*G11B 33/12*　　(2006.01)
　　*G11B 7/085*　　(2006.01)

(52) U.S. Cl.
　　CPC ............. *G11B 33/121* (2013.01); *G11B 7/085* (2013.01)

(58) Field of Classification Search
　　CPC ............ G11B 7/085; G11B 7/08; G11B 7/00
　　USPC ........................................ 720/676, 679, 663
　　See application file for complete search history.

(56) References Cited

U.S. PATENT DOCUMENTS

| 8,427,289 B2* | 4/2013 | Ghabra | B60R 25/24 |
| | | | 340/426.36 |
| 8,766,769 B2* | 7/2014 | Lange | E05B 81/14 |
| | | | 340/5.61 |
| 2007/0300245 A1* | 12/2007 | Tsutsumi | G11B 17/0515 |
| | | | 720/619 |

* cited by examiner

*Primary Examiner* — Allen T Cao
(74) *Attorney, Agent, or Firm* — Birch, Stewart, Kolasch & Birch, LLP

(57) ABSTRACT

Disclosed herein are an optical disc drive and a feeding base. The feeding base is coupled to a spindle motor base and a stepping motor base. Main and sub-shafts for guiding inner and outer circumferential movements of an optical pickup unit are mounted on the feed base. The feeding base is made of a steel plate of a rectangular rim shape having an empty center corresponding to a space in which the optical pickup unit moves, the feeding base includes two guides for guiding the coupling location of the spindle motor base, and at least one guide of the two guides is formed by protruding the steel plate to form a funnel shape such that the side cross section of the at least one guide may have a slope section corresponding to a cone and a straight-line section corresponding to a cylinder.

11 Claims, 8 Drawing Sheets

- Prior Art -

- Prior Art -

- Prior Art –

- Prior Art -

OPTICAL DISC DRIVE

CROSS-REFERENCE TO RELATED APPLICATION

Pursuant to 35 U.S.C. §119(a), this application claims the benefit of earlier filing date and right of priority to Korean Patent Application No. 10-2015-0026503, filed on Feb. 25, 2015, the contents of which are incorporated by reference herein in their entirety.

BACKGROUND OF THE INVENTION

1. Field of the Invention

The present invention relates to an optical disc drive and, more particularly, to the structure of the feeding base of an optical disc drive.

2. Discussion of the Related Art

In an optical disc drive, a structure called a feeding assembly is configured so that parts, such as a spindle motor for rotating an optical disc, an optical pickup unit for recording data on an optical disc or playing back data recorded on the optical disc, and a stepping motor for moving the optical pickup unit to the inner and outer circumferential directions of the optical disc, are assembled into a single base. The base in which the parts are assembled is called a feeding base.

A conventional method for assembling the parts in a feeding base includes two methods: (1) a method for assembling the parts in an electrically zinc-coated steel plate (SECC: a steel plate produced by producing a steel material by cold stripping and coating it with zinc plating) and (2) a method for assembling the parts in the base in which an SECC steel plate is covered with a mold in an outsert form. The method (1) is disadvantageous in that it is difficult to achieve price competitiveness because guide parts for assembling the parts at regular positions are required and thus the number of required parts is increased. The method (2) is advantageous in that the feeding assembly can be configured using a smaller number of parts because all of the guides for assembling the parts at regular locations are configured in an outsert, but is disadvantageous in that a cost for fabricating the outsert is required.

SUMMARY OF THE INVENTION

Accordingly, the present invention has been made keeping in mind the above problems occurring in the prior art, and an object of the present invention is to provide a feeding base having the simplest structure and using minimum parts.

Another object of the present invention is to provide a feeding base in which parts can be assembled using only a press-processed SECC steel plate.

In an embodiment of the present invention, the feeding base of an optical disc drive is coupled to a spindle motor base on which a spindle motor for rotating an optical disc has been mounted and coupled to a stepping motor base on which a stepping motor for moving an optical pickup unit in inner and outer circumferential directions has been mounted. A main shaft and a sub-shaft for guiding the inner and outer circumferential movements of the optical pickup unit are mounted on the feed base. In this case, the feeding base may be made of a steel plate of a rectangular rim shape having an empty center corresponding to the space in which the optical pickup unit moves, the feeding base may include two guides for guiding the coupling location of the spindle motor base, and at least one guide of the two guides is formed by protruding the steel plate to form a funnel shape such that the side cross section of the at least one guide may have a slope section corresponding to a cone and a straight-line section corresponding to a cylinder.

In an embodiment, part of the steel plate may be bent to form the other of the two guides.

In an embodiment, the bent portion of the second guide may include two portions having different widths in the inner and outer circumferential directions. A stepped slope may be formed between the two portions.

In an embodiment, the sub-shaft may be formed by processing part of the steel plate of the rectangular rim shape in a bending form.

In an embodiment, the inside boundary of the outer circumference portion of a short side on which the spindle motor base has not been mounted in the rectangular rim shape may be protruded toward the inner circumference in the state in which the inside boundary has been bent in such a way as not to interfere with the optical pickup unit which has moved to the outermost circumference.

An optical disc drive according to another embodiment of the present invention includes a spindle motor base on which a spindle motor for rotating an optical disc has been mounted, an optical pickup unit for recording data on the optical disc or playing back data recorded on the optical disc, a stepping motor base on which a stepping motor for moving the optical pickup unit in inner and outer circumferential directions has been mounted, a main shaft and sub-shaft for guiding the inner and outer circumferential movements of the optical pickup unit, and a feeding base on which the spindle motor base, the stepping motor base, the main shaft, and the sub-shaft are mounted, for providing a moving space of the optical pickup unit. The feeding base may be made of a steel plate of a rectangular rim shape having an empty center corresponding to a space in which the optical pickup unit moves, the feeding base may include two guides for guiding a coupling location of the spindle motor base, and at least one guide of the two guides is formed by protruding the steel plate to form a funnel shape such that the side cross section of the at least one guide has a slope section corresponding to a cone and a straight-line section corresponding to a cylinder.

In an embodiment, the spindle motor base may include two assembly holes corresponding to the two guides and a plurality of screw holes into which a plurality of screws for coupling the spindle motor base to the feeding base may be inserted. Two screws of the plurality of screws may couple the spindle motor base and the feeding base and adjust a height of the spindle motor base in the state in which the springs have been respectively inserted into the two screws. The first spring close to the place where the main shaft has been mounted may include a coil portion and an extended portion. The extended portion may support the main shaft.

In an embodiment, the coil portion of the first spring may be fixed to a boss formed in the feeding base. The end of the extended portion may be fixed to the feeding base in a hook form. Part of the extended portion may be bent twice, may come in contact with the main shaft, and may provide an elastic force for fixing the main shaft to the feeding base in a tangential direction vertical to the inner and outer circumferential directions and upward and downward directions.

A structure according to an embodiment of the present invention has been intended to implement a structure for assembling the parts using an SECC steel plate using only press processing. The structure is quite different from the conventional structures in that it has a small number of parts because separate parts are not used and it has the most price competitiveness because a mold structure, such as the outsert, is not used.

Furthermore, a structure according to an embodiment of the present invention is different from the conventional structures in that it is a structure using only a press-processed SECC steel plate and it implements an excellent structure in terms of quality management because the mold part is not used and thus a dimension variation distribution is small in major function units in mass production.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE EMBODIMENTS

Figure 1:
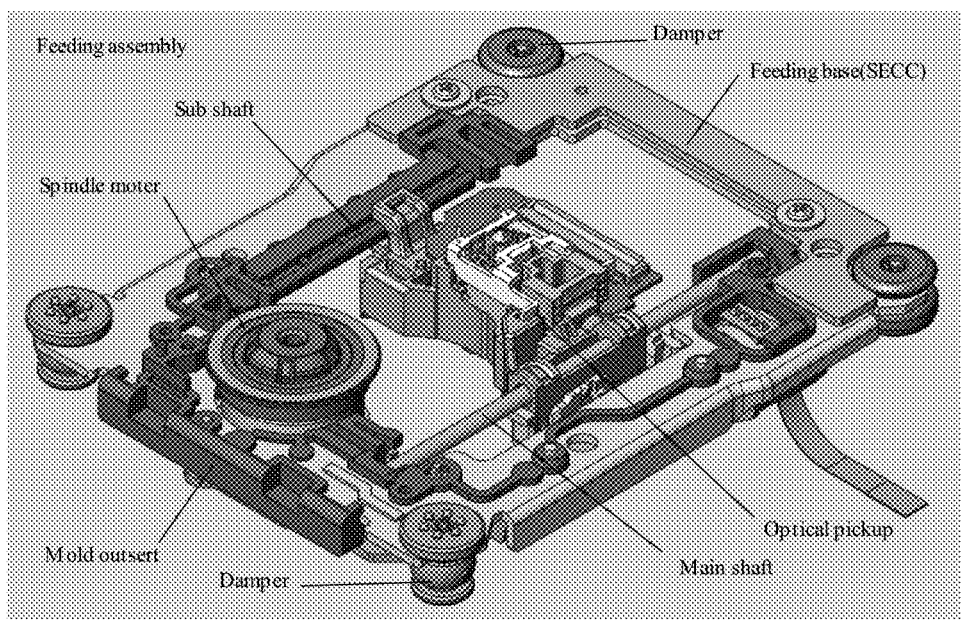
FIGS. 1 and 2 are perspective views of the plane and back of a feeding assembly adopting the feeding base of a conventional outsert mold type.

The above object, characteristics, and merits of the present invention will become more apparent from the following detailed description taken in conjunction with the accompanying drawings. The present invention may be modified in various ways and may have some embodiments. Hereinafter, some exemplary embodiments of the present invention will be illustrated in the accompanying drawings and described in detail. The same reference numerals basically designate the same elements throughout the drawings. Furthermore, in describing the present invention, a detailed description of known functions or elements relating to the present invention will be omitted if it is deemed to make the gist of the present invention unnecessarily vague. Numbers (for example, the first and the second) used to describe the present invention are merely identification symbols for distinguishing one element from the other element.

Hereinafter, the feeding base of an optical disc drive according to an embodiment of the present invention is described in detail with reference to the accompanying drawings.

It is to be noted that the suffixes of elements used in the following description, such as a "module" and a "unit," are assigned or interchangeable with each other by taking into consideration only the ease of writing this specification, but in themselves are not particularly given distinct meanings and roles.

An optical disc drive is a device configured to rotate an optical disc placed on the turntable of a spindle motor and clamped thereto and to read data recorded on the rotating optical disc or record data on the rotating optical disc while moving an optical pickup unit in the inner and outer circumferential directions of the optical disc through the stepping motor. The optical pickup unit moves between the inner and outer circumferential directions of the optical disc when the stepping motor is rotated in the state in which a main shaft and a sub-shaft have been respectively inserted into a main shaft coupling unit and a sub-shaft coupling unit and a feeder has been coupled to a lead screw coupled to the stepping motor.

Figure 2:
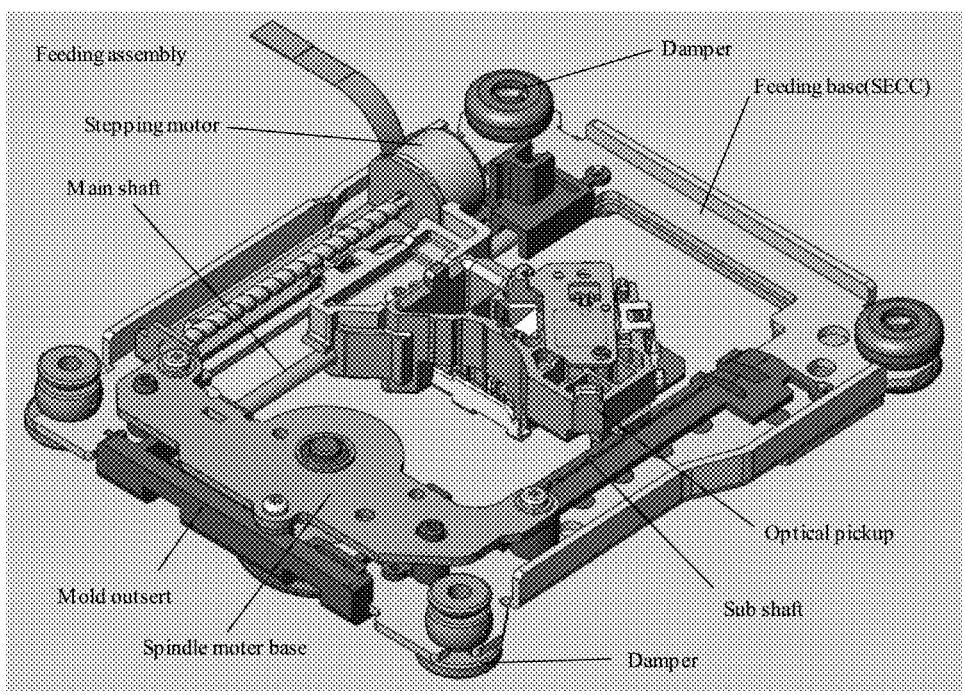
Figure 3:
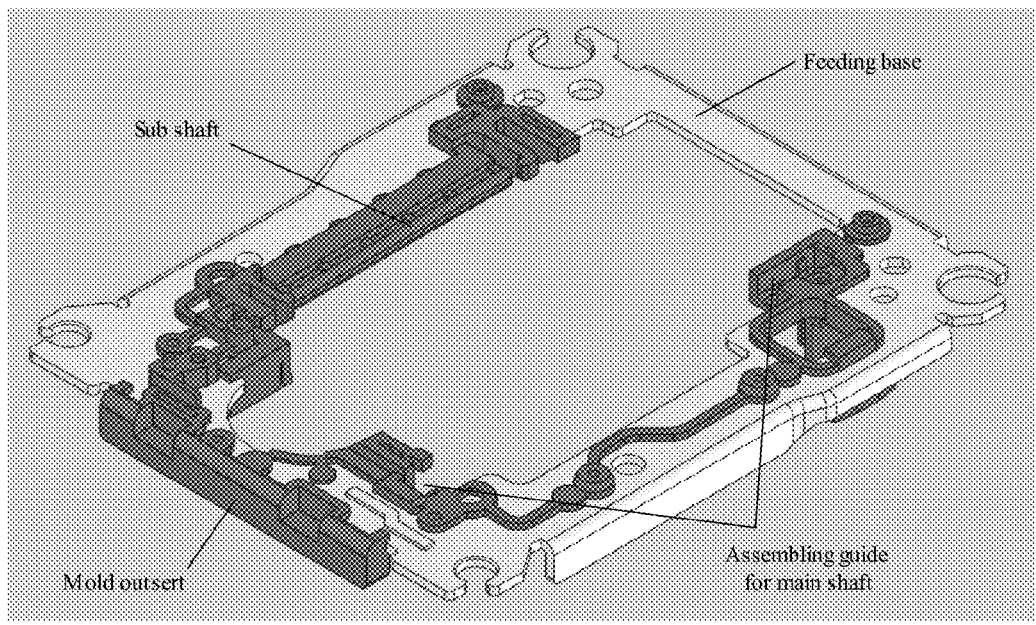
FIGS. 3 and 4 are perspective views of the plane and back of the feeding base of the conventional outsert mold type.
Figure 4:
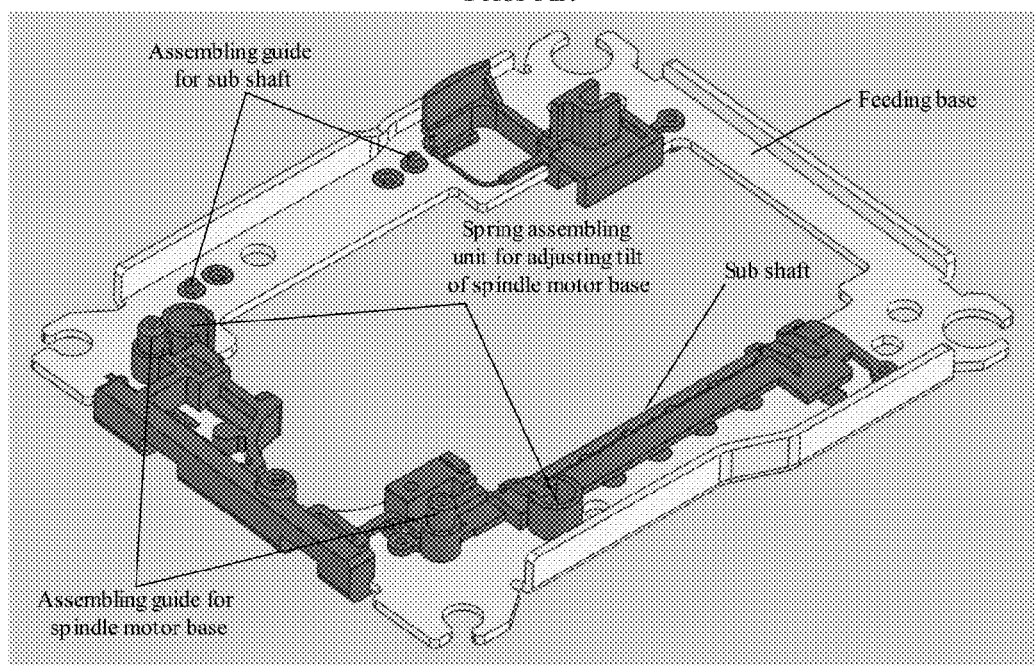

FIGS. 1 and 2 are perspective views of the plane and back of a feeding assembly adopting the feeding base of a conventional outsert mold type, and FIGS. 3 and 4 are perspective views of the plane and back of the feeding base of the outsert mold type.

As shown in FIGS. 1 and 2, the conventional feeding assembly has a structure in which parts, such as an optical pickup unit, a spindle motor base, and a stepping motor base, have been assembled in a feeding base in which an SECC steel plate is covered with a mold outsert.

Furthermore, in the conventional feeding base, a mold is covered in an outsert form in order to assemble parts. A guide for assembling the spindle motor base, a spring assembly unit for adjusting a tilt, a guide for assembling the stepping motor base, a guide for assembling a main shaft that guides a movement of the optical pickup unit in the inner and outer circumferential directions, and a sub-shaft for assisting the main shaft in order to guide the movement of the optical pickup unit in the inner and outer circumferential direction are formed in the mold outsert.

An optical disc drive including the feeding assembly may have proper recording and playback performance only when the optical pickup unit and the optical disc are horizontal to each other. Furthermore, in a process of assembling the feeding assembly, the main/sub-shafts coupled to the optical pickup unit and the spindle motor on which the optical disc is placed are adjusted so that they become horizontal to each other.

A method for controlling the horizontality of the main/sub-shafts and the spindle motor basically includes two methods, including a shaft control method for adjusting the heights of the main shaft and the sub-shaft and a motor control method for adjusting the skew of the spindle motor.

In the shaft control method, the heights of the main shaft and the sub-shaft are adjusted. If a separate mold part is not used, the main shaft and the sub-shaft need to be adjusted in parallel and also need to be adjusted to become parallel to the spindle motor. Accordingly, three screws and three springs are required because the heights of the main shaft and the sub-shaft are adjusted at three points after the spindle motor is fixed to a predetermined location.

In the motor control method, the location where the spindle motor base is assembled is adjusted up and down. If a mold outsert structure is adopted in the feeding base, as shown in FIGS. 1 to 4, the adjustment of the sub-shaft coupled to the optical pickup unit can be omitted due to the outsert mold. Furthermore, the location of the spindle motor base can be fixed by forming two bosses in the outsert mold, and the skew or tilt of the spindle motor base in two directions, that is, a radial direction and a tangential direction, can be adjusted using two screws and two springs at two points.

In order to adjust optical pickup and the optical disc so that they become parallel when fabricating the feeding assembly as described above, the motor control method using the outsert mold structure in the feeding base is advantageous. Accordingly, the motor control method is applied to embodiments of the present invention and is described below.

In an embodiment of the present invention, a structure capable of adjusting the height of the spindle motor can be formed by the drawing of an SECC steel plate, that is, one of the main ingredients of the feeding base, so that the tilt of the spindle motor can be adjusted while changing the height of the spindle motor without using the outsert or a separate mold part. The drawing structure has a funnel shape in order to maximize the height and enable the adjustment of the tilt.

Furthermore, in an embodiment of the present invention, the main shaft to guide a movement of the optical pickup unit in the inner and outer circumferential directions can be fixed by modifying the shape of a spring installed to provide a restoring force when adjusting the tilt of the spindle motor without using a separate mold part, spring, or screw in order to fix the main shaft.

Furthermore, in an embodiment of the present invention, a structure corresponding to the sub-shaft for assisting the main shaft can be formed by forming part of the SECC steel plate in a bending form by pressing without using a separate stainless (SUS) shaft, the outsert, or the mold part.

Furthermore, in an embodiment of the present invention, instead of overlapping a separate press-processed SECC with the location of the outer circumference of the feeding base, that is, the location where the SECC steel plate does not come in contact with the optical pickup unit when the optical pickup unit moves up to the outermost circumference, the outer circumference of the SECC steel plate, that is, the feeding base, is extended in the inner circumferential direction, but is bent so that it does not interfere with the optical pickup unit that has moved to the outermost circumference. Accordingly, vibration performance of the feeding base can be improved because weight of the feeding base is increased.

Figure 5:
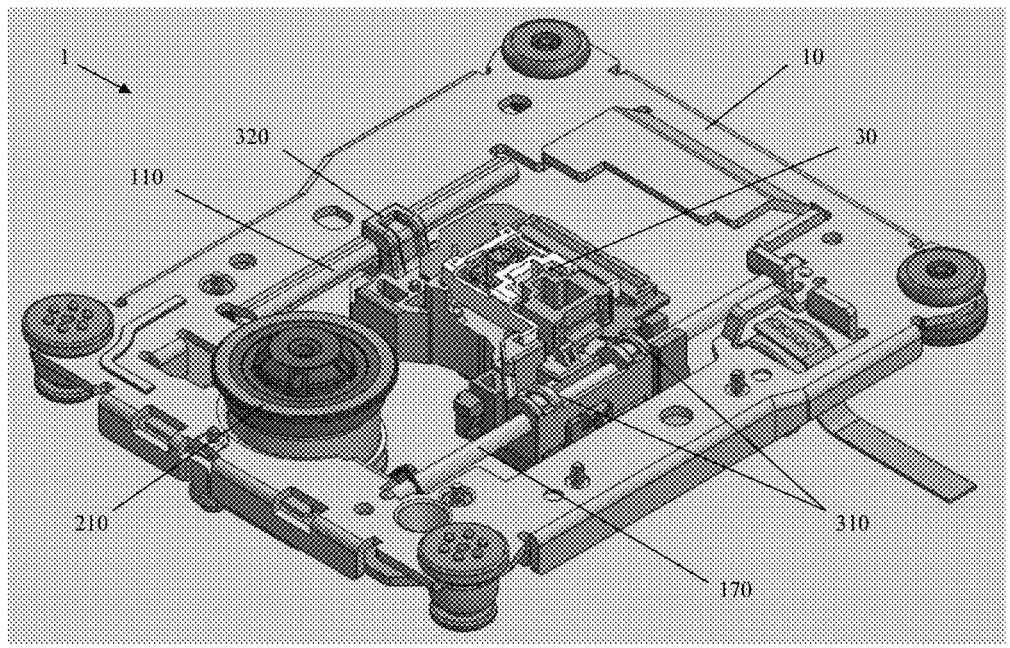
FIGS. 5 and 6 are perspective views of the plane and back of a feeding assembly adopting a feeding base according to an embodiment of the present invention.
Figure 6:
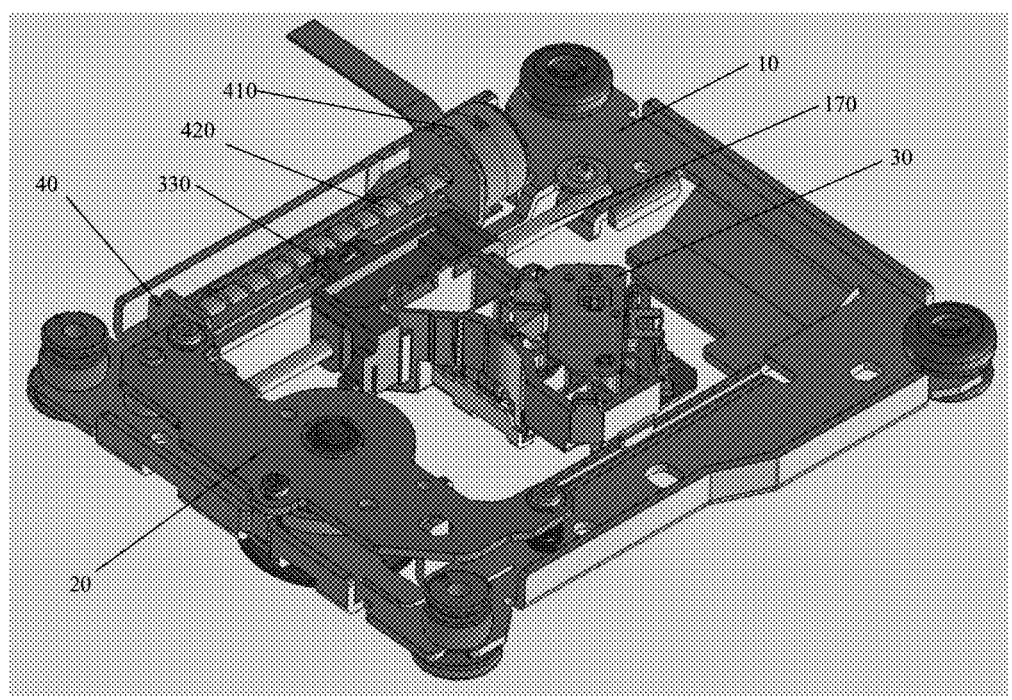
Figure 7:
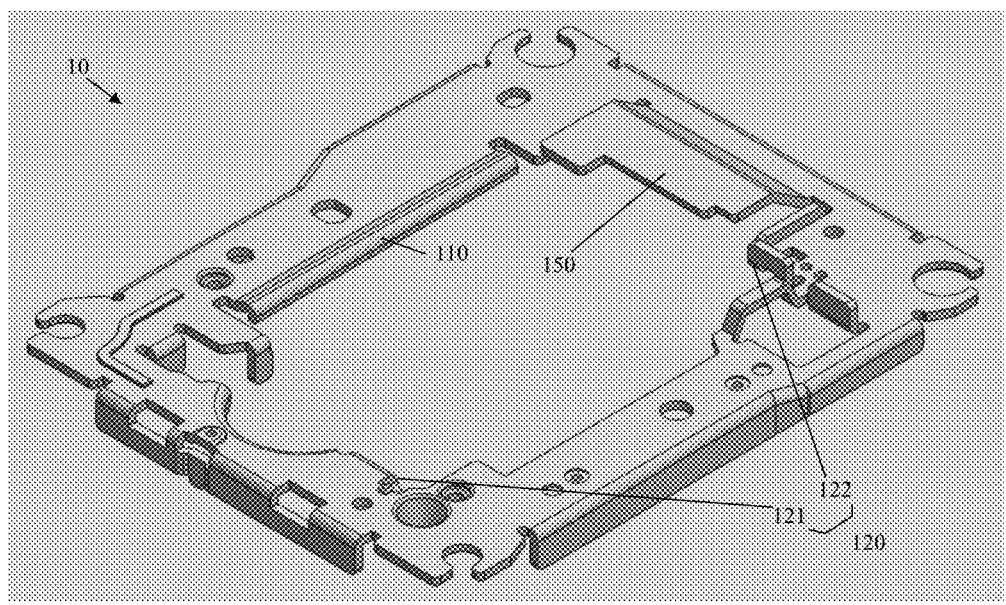
FIGS. 7 and 8 are perspective views of the plane and back of the feeding base according to an embodiment of the present invention.
Figure 8:
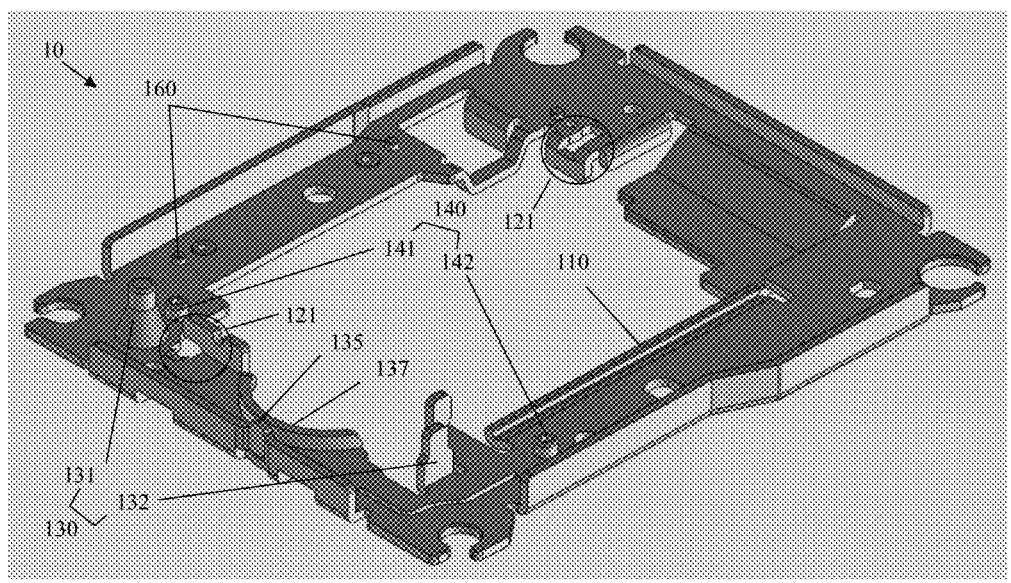

FIGS. 5 and 6 are perspective views of the plane and back of a feeding assembly adopting a feeding base according to an embodiment of the present invention, and FIGS. 7 and 8 are perspective views of the plane and back of the feeding base according to an embodiment of the present invention.

The feeding assembly 1 has a spindle motor base 20, an optical pickup unit 30, and a stepping motor base 40 mounted on a feeding base 10. The feeding assembly is installed within an optical disc drive and is responsible for mechanical operations in recording and reproducing an optical disc.

The feeding base 10 has a rectangular rim shape in which the inside of the rectangle is empty for the space in which a spindle motor 210 will be installed and the space in which an optical pickup unit 30 will move in inner and outer circumferential directions. Dampers for absorbing an external impact may be installed at the four corners of the feeding base 10.

Furthermore, the spindle motor base 20 may be mounted on one short-side portion (i.e., an inner circumference portion) of the rectangular rim. In this case, the inner circumference portion is named because an optical disc is seated in the spindle motor 210 and the inner circumference portion corresponds to the inner circumference of the optical disc. The stepping motor base 40 may be mounted on one long-side portion (i.e., first long-side portion) of the rectangular rim. A main shaft 170 may be mounted in the inside empty space close to the first long-side portion. The internal boundary of the other long-side portion (i.e., second long-side portion) of the rectangular rim may be bent to form a sub-shaft 110. The internal boundary of the other short-side portion (i.e., outer circumference portion) of the rectangular rim is bent and protruded toward inner circumference portion, thus forming an outer circumference bent unit 150. The main shaft coupling unit 310 and sub-shaft coupling unit 320 of the optical pickup unit 30 may be inserted into the main shaft 170 and the sub-shaft 110, respectively. A feeder 330 may be coupled to a lead screw 420 and installed within the feeding base 10 of the rectangular rim shape.

The spindle motor 210 is coupled to the feeding base 10 so that a turntable is directed toward the upper side in the state in which the spindle motor has been mounted on the spindle motor base 20. Furthermore, the optical pickup unit 30 is inserted into the main shaft 170 and the sub-shaft 110 so that an object lens 340 (refer to FIG. 11) is directed toward the upper side of the feeding base 10. The stepping motor base 40 on which a stepping motor 410 has been mounted is mounted on the back of the feeding base 10.

The main shaft 170 is fixed by a main shaft assembly guide 120 formed in the feeding base 10. Both ends of the main shaft 170 may be fixed to first and second main shaft assembly guides 121 and 122 formed at places where the inner circumference portion and the outer circumference portion meet the first long-side portion in the rectangular rim shape of the feeding base 10. The first and the second main shaft assembly guides 121 and 122 may have any shape if they fix the shaft on both sides.

In the rectangular rim shape of the feeding base 10, a stepping motor assembly guide 160 to be coupled to the stepping motor base 40 is provided in the back of the second long-side portion. At least two stepping motor assembly guides, that is, first and second stepping motor assembly guides 160, may be protruded in a boss form and inserted into holes formed in the stepping motor base 40.

In the rectangular rim shape of the feeding base 10, parts for assembling the spindle motor base 20 and adjusting the location and height of the spindle motor base 20, that is, a spindle motor assembly guide 130 and a spring assembly unit 140, are formed in the back of the inner circumference portion. The spring assembly unit 140 may be formed in the back of the first long-side portion and the second long-side portion. The spring assembly unit 140 may be formed in the back of the boundary of the inner circumference portion and the first-side portion and the boundary of the inner circumference portion and the second-side portion.

The spindle motor assembly guide 130 may include a first spindle motor assembly guide 131 configured to have a funnel shape and protruded in the downward direction of the feeding base 10, a second spindle motor assembly guide 132 bent toward the downward direction of the feeding base 10, a spindle motor base support unit 135 bent in the downward direction of the feeding base 10, and a spindle motor outer circumference guide 137 bent in the downward direction of the feeding base 10 and configured to have an arc shape so as to guide part of the outer circumference surface of the spindle motor 210.

Bosses are formed in the spring assembly unit 140 so that coil springs are inserted into the outer circumference of the respective bosses. The spring assembly unit 140 may include first and second spring combination units 141 and 142 in each of which a female screw to be engaged with a screw 190 has been formed at the inner circumference of the boss.

Figure 9:
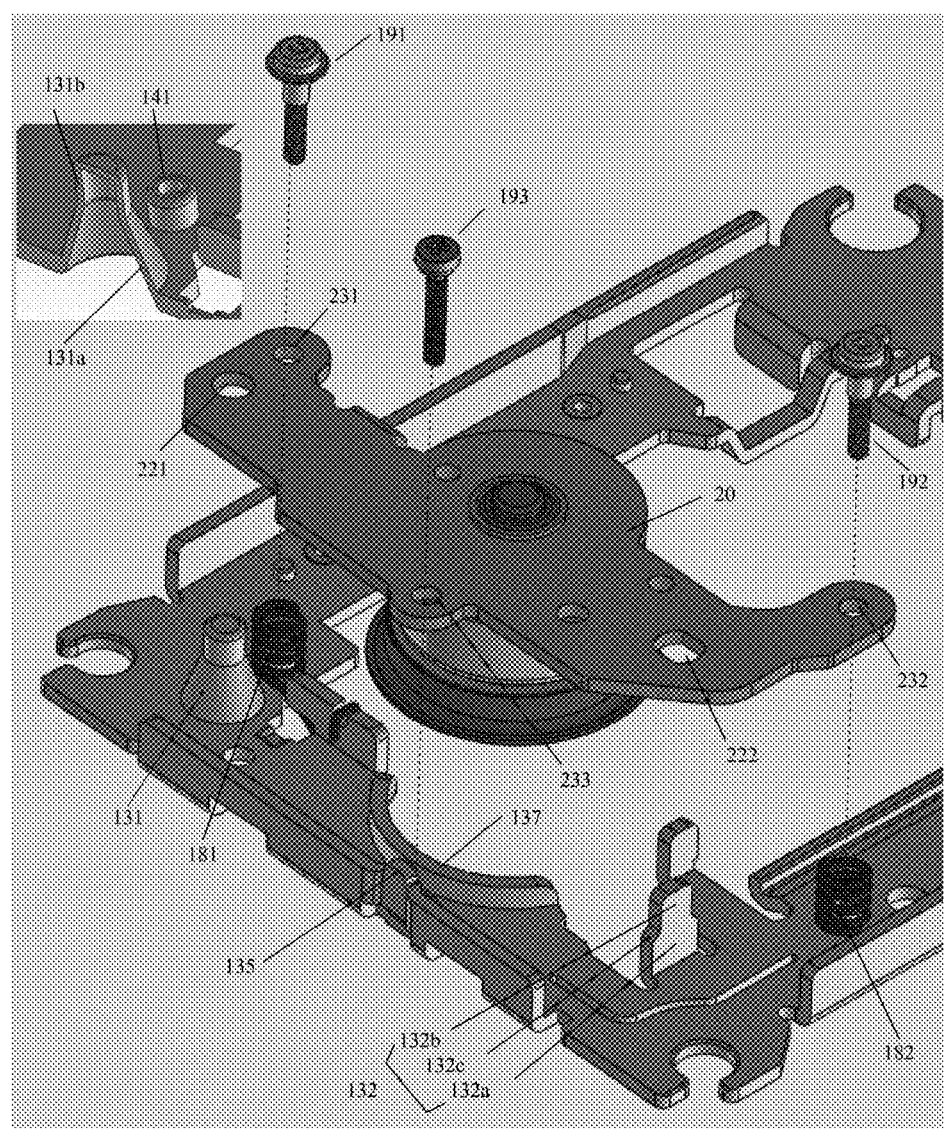
FIG. 9 shows a structure for guiding a location and adjusting a tilt when a spindle motor base is assembled with the feeding base according to an embodiment of the present invention.

FIG. 9 shows a structure for guiding a location and adjusting a tilt when a spindle motor base is assembled with the feeding base according to an embodiment of the present invention.

The first spindle motor assembly guide 131 may be placed near a portion where the inner circumference portion of the rectangular rim shape meets the first long-side portion to which the main shaft 170 is fixed. The second spindle motor assembly guide 132 may be placed near a portion where the inner circumference portion of the rectangular rim shape meets the second long-side portion in which the sub-shaft 110 is formed. The spindle motor base support unit 135 may be placed in the middle on the basis of a tangential direction vertical to the inner and outer circumferential directions (i.e., radial direction) in the inner circumference portion of the rectangular rim shape and may be placed at the outermost end of the inner circumference portion on the basis of the radial direction. The first spring combination unit 141 may be placed on the outer circumferential side than the first spindle motor assembly guide 131 on the basis of the radial direction. The second spring combination unit 142 may be placed on the outer circumferential side than the second spindle motor assembly guide 131 and may be placed on the outer circumferential side than the first spring combination unit 141 on the basis of the radial direction.

The first spindle motor assembly guide 131 is formed by protruding a steel plate forming the feeding base 10 using a drawing method without attaching a separate part. The first spindle motor assembly guide 131 includes a slope portion 131*a* having a side cross section of a cone shape and corresponding to an inclined portion and a straight-line portion 131*b* having a cylindrical shape and corresponding to a straight-line portion. The first spindle motor assembly guide 131 generally has a funnel shape.

In some embodiments, the first spindle motor assembly guide 131 may include a second slope portion that is steeper than the slope portion 131*a* and corresponds to some section of a cone shape and that stands upright on the slope portion 131*a*, instead of the straight-line portion 131*b*. In some embodiments, only the slope portion 131*a* corresponding to some of or the entire cone may be formed without forming the straight-line portion 131*b* or the second slope portion.

The first spindle motor assembly guide 131 may determine the location of the spindle motor base 20 in the radial direction and the tangential direction.

The second spindle motor assembly guide 132 is formed by bending a portion that belongs to the second long-side portion and that has been protruded in a direction toward the main shaft 170 (i.e., the tangential direction) so that the portion is directed toward the downward direction of the feeding base 10 in a bent line formed in the inner and outer circumferential directions (i.e., the radial direction). A protrusion portion that is bent and downward directed has a step in the width of the radial direction from the bent line to the end of the protrusion portion. Accordingly, the width of a first protrusion portion 132*a* close to the bent line may be greater than the width of a second protrusion portion 132*b* far from the bent line. Furthermore, a stepped slope 132*c* whose width is continuously changed may be formed between the first protrusion portion 132*a* and the second protrusion portion 132*b*.

The second spindle motor assembly guide 132 may determine the location of the spindle motor base 20 in the radial direction.

The spindle motor base support unit 135 is placed at about the center of the first and the second spindle motor assembly guides 131 and 132 on the basis of the tangential direction and is placed on the inner circumferential side than the first and the second spindle motor assembly guides 131 and 132 on the basis of the radial direction.

The height up to the boundary of the slope portion 131*a* and the straight-line portion 131*b* (i.e., a height from the plane of the feeding base 10) in the first spindle motor assembly guide 131, the height up to the boundary of the first protrusion portion 132*a* and the second protrusion portion 132*b* in which the stepped slope 132*c* of a width in the radial direction has been formed in the second spindle motor assembly guide 132, and the height up to the bent end of the spindle motor base support unit 135 may be determined by the range in which the height of the spindle motor base 20 may be adjusted. The heights may be different within the thickness of the spindle motor base 20. The reason for this is that the first and the second spindle motor assembly guides 131 and 132 are inserted through holes formed in the spindle motor base 20 and the spindle motor base support unit 135 supports one surface of the spindle motor base 20.

The spindle motor 210 is installed at the center of the spindle motor base 20, and the spindle motor base 20 has a shape long in the tangential direction. Two assembly holes 220 and a plurality of screw holes 230 may be formed in the spindle motor base 20 so that the location of the spindle motor base 20 can be taken when it is coupled to the feeding base 10 and the height of the spindle motor 210 can be adjusted.

The assembly hole 220 includes a circular hole 221 formed in a circle so that the cylindrical straight-line portion 131*b* of the first spindle motor assembly guide 131 can enter and exit from the circular hole 221 and a long hole 222 formed so that the end of the second spindle motor assembly guide 132 can enter and exit from the long hole 222.

The diameter of the circular hole 221 is greater than the width of the cylindrical straight-line portion 131*b* of the first spindle motor assembly guide 131 within a specific range. Accordingly, when the spindle motor base 20 is coupled to the feeding base 10, the bottom of the circular hole 221 may be spanned on the conical slope portion 131*a* of the first spindle motor assembly guide 131. The size of the long hole 222 in a radial direction may correspond to the protrusion portion of the second spindle motor assembly guide 132, and the size of the long hole 222 in a tangential direction may be greater than the size thereof in the radial direction. The size of the long hole 222 in the radial direction may be greater than the width of the second protrusion portion 132*b* and may be smaller than the width of the first protrusion portion 132*a*. Accordingly, when the spindle motor base 20 is coupled to the feeding base 10, the bottom of the long hole 222 may be spanned on the stepped slope 132*c*.

The screw hole 230 may include first and second adjustment screw holes 231 and 232 formed at respective locations corresponding to the first and the second spring combination units 141 and 142 and a fixing screw hole 233 placed at about the center of the first and the second adjustment screw holes 231 and 232 on the basis of a tangential direction and formed on the inner circumferential side than the first and the second adjustment screw holes 231 and 232 on the basis of a radial direction.

The outer circumference of the spindle motor 210 of the spindle motor base 20 may be guided into the spindle motor outer circumference guide 137. The first and the second spindle motor assembly guides 131 and 132 may be inserted into the circular hole 221 and the long hole 222, and the bottom of the spindle motor base 20 may be supported by the spindle motor base support unit 135. Accordingly, the location of the spindle motor base 20 can be taken and thus the spindle motor base 20 can be assembled in the feeding base 10. Furthermore, first and second adjustment screws 191 and 192 may be inserted into the first and the second adjustment screw holes 231 and 232 and may be coupled to female screws formed at the inner circumferences of the first and the second spring assembly units 141 and 142. A fixing screw 193 may be inserted into the fixing screw hole 233, may be coupled to a female screw hole formed in the feeding base 10, and may be fixed to the feeding base 10.

The location of the plane of the spindle motor base 20 may be fixed by the coupling of the circular hole 221 and the first spindle motor assembly guide 131, the coupling of the long hole 222 and the second spindle motor assembly guide 132, and the coupling of the holes of the fixing screw 193 and the feeding base 10.

When the first and the second adjustment screws 191 and 192 are coupled to the first and the second spring assembly units 141 and 142, first and second tilt adjustment springs 181 and 182 are inserted between the feeding base 10 and the spindle motor base 20, and the first and the second tilt adjustment springs 181 and 182 function as forces that push the feeding base 10 and the spindle motor base 20. Accordingly, tilts in the radial direction and the tangential direction can be adjusted through the first and the second adjustment screws 191 and 192.

By the couplings of the first and the second tilt adjustment springs 181 and 182 and the first and the second adjustment screws 191 and 192 on the outer side than the spindle motor base support unit 135 on the basis of a tangential direction and on the outer circumferential side on the basis of a radial direction, in the state in which the spindle motor base 20 has been supported by the spindle motor base support unit 135 and the center of the spindle motor base 20 in the tangential direction and the height of the spindle motor base 20 on the inner circumference in the radial direction have been fixed, the tilt of the spindle motor base 20 can be adjusted, that is the height of the spindle motor base 20 in the tangential direction and the height of the spindle motor base 20 in the radial direction may be adjusted.

Furthermore, the height of the spindle motor base 20 can be adjusted through the springs 180 and the screws 190 because the first spindle motor assembly guide 131 includes the slope portion 131a, the second spindle motor assembly guide 132 includes the stepped slope 132c, and the bottoms of the circular hole 221 and long hole 222 of the spindle motor base 20 are spanned on the slope portion 131a and the stepped slope 132c. For reference, as shown in FIG. 9, the height of the spindle motor base 20 in the radial direction may be adjusted by disposing the second spring assembly unit 142 on the outer circumferential side than the first spring assembly unit 141.

Furthermore, the second spindle motor assembly guide 132 may be configured to have the same shape as the first spindle motor assembly guide 131, but may adopt a bent structure so as to reduce a cost.

Figure 10A:
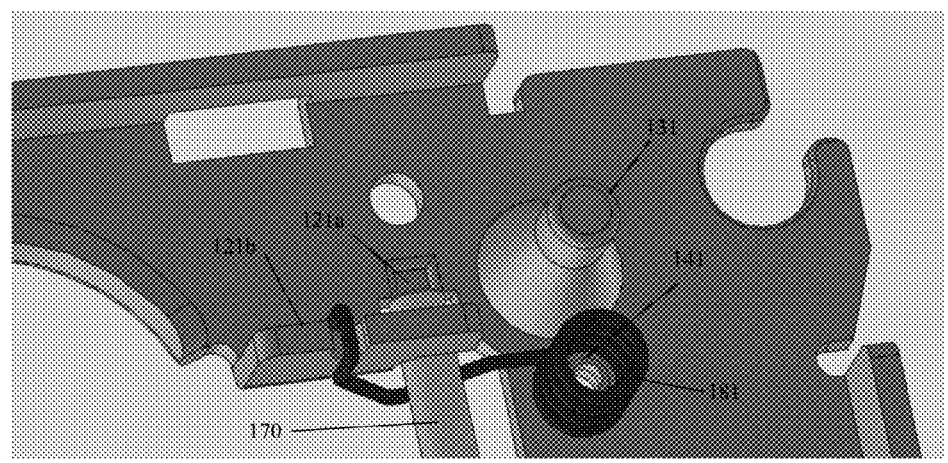
FIGS. 10a to 10c show a structure for fixing a main shaft for guiding a movement of an optical pickup unit to the feeding base according to an embodiment of the present invention.
Figure 10B:
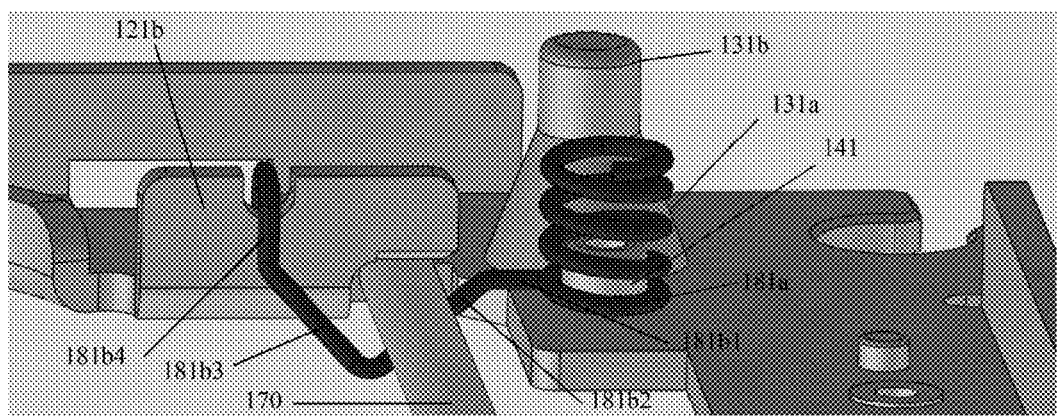
Figure 10C:
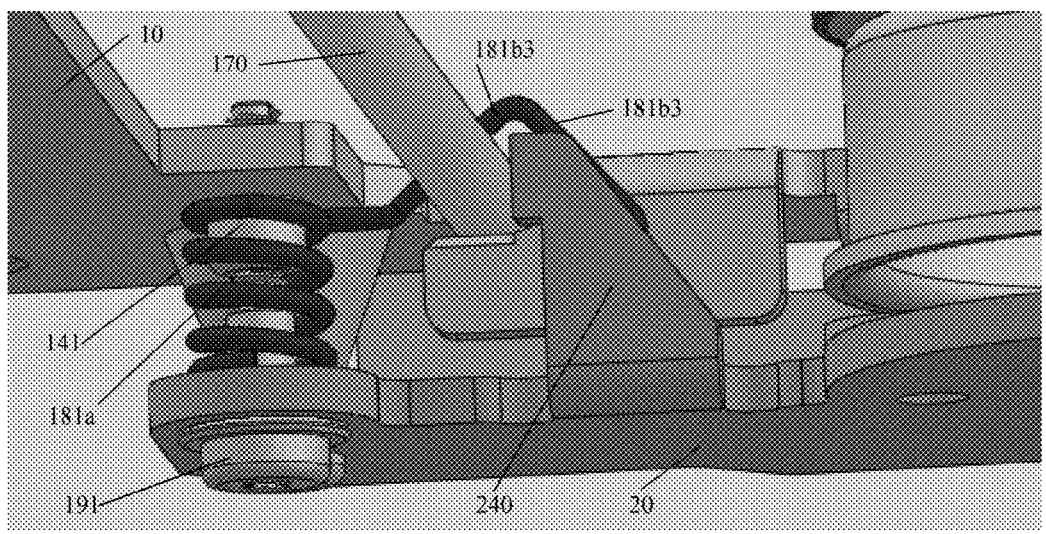

FIGS. 10a to 10c show a structure for fixing the main shaft for guiding a movement of the optical pickup unit to the feeding base according to an embodiment of the present invention.

In the rectangular rim shape of the feeding base 10, first and second main shaft assembly guides 121 and 122 are formed at the places where the inner circumference portion and the outer circumference portion meet the first long-side portion. Grooves 121a may be formed so that both ends of the main shaft 170 may be seated in them. Parts of the inner circumference portion and the outer circumference portion may be protruded or bent and may come in contact with the main shaft 170, being capable of guiding an assembly location.

FIG. 10 shows the first main shaft assembly guide 121. In the inner circumference portion of the rectangular rim shape of the feeding base 10, part of the inside boundary may be downward bent to form a bent portion 121b. Part of the bent portion 121b may be protruded toward the first long-side portion and may upward support the main shaft 170 on the basis of the height direction. Furthermore, the groove 121a may be formed in the inner circumference portion and may downward support the main shaft 170 on the basis of the height direction.

The groove 121a formed in the inner circumference portion of the rectangular rim shape of the feeding base 10 also functions to fix the main shaft 170 on the basis of a tangential direction. Furthermore, a lower part of the protruded portion in the bent portion 121b that corresponds to the first main shaft assembly guide 121 may also outward support the main shaft 170 in the tangential direction.

Furthermore, as shown in FIG. 10c, a bent portion 240 may be upward formed in a wind portion (i.e., a form outward stretched from the spindle motor on the basis of the tangential direction) which belongs to the spindle motor base 20 and in which the circular hole 221 has been formed so that the main shaft 170 is outward supported on the basis of the tangential direction additionally.

As shown in FIG. 10, the first tilt adjustment spring 181 may include a coil unit 181a for providing an elastic force for adjusting the tilt of the spindle motor base 20 and an extension unit 181b for providing an elastic force so that the main shaft 170 can be fixed to the feeding base 10. The extension unit 181b may be extended from the end of the coil unit 181a, coupled to the boss of the first spring combination unit 141, to the inside on the basis of the tangential direction (i.e., a first extension unit 181b1), may be bent 45° upward and inward on the basis of the tangential direction (i.e., a second extension unit 181b2), may be bent 90° downward and inward on the basis of the tangential direction (i.e., a third extension unit 181b3), may surround the main shaft 170 assembled in the feeding base 10, may be downward bent 45° to form a hook (i.e., a fourth extension unit 181b4), and may be then fixed to the bent portion 121b, that is, part of the first main shaft assembly guide 121.

In the extension unit 181b of the first tilt adjustment spring 181, the second extension unit 181b2 that is bent 45° upward and inward on the basis of the tangential direction may come in contact with the main shaft 170 and transfer a fixing force, directed toward the downward direction and inward direction on the basis of the tangential direction, to the main shaft 170.

That is, the first tilt adjustment spring 181 may be fixed to the feeding base 10 by the coil unit 181a and the hook of the fourth extension unit 181b4, and the arm shape of the extension unit 181b may push and support the main shaft 170.

Figure 11:
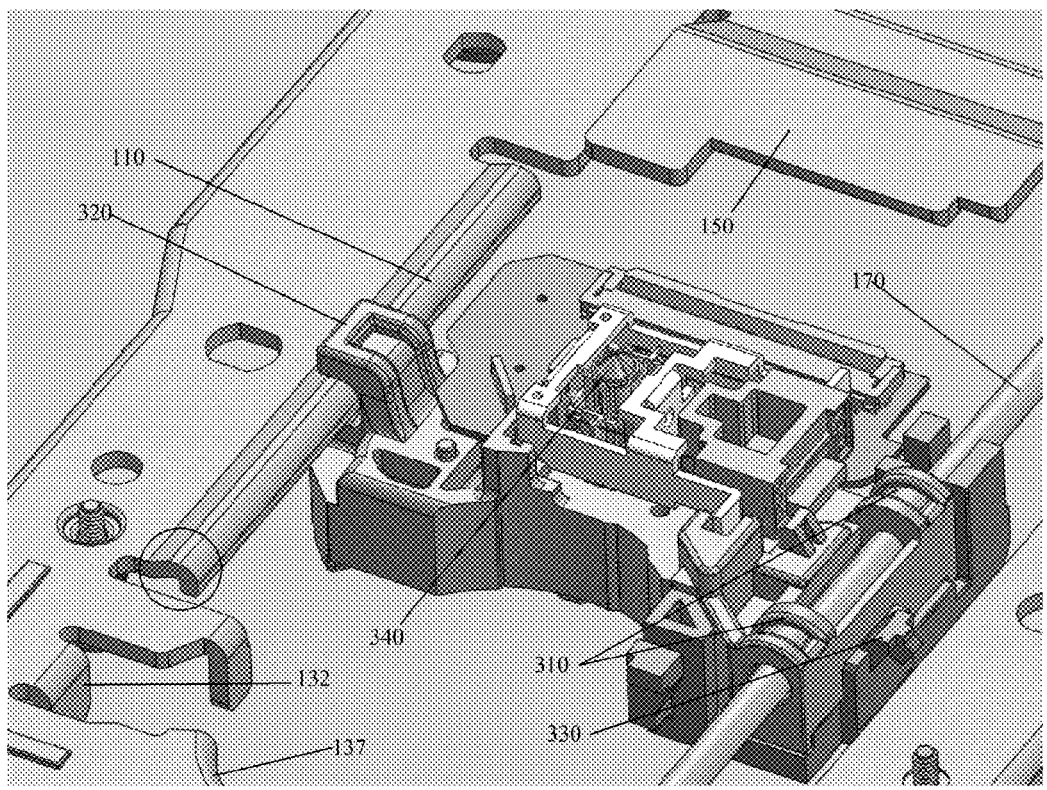
FIG. 11 shows a structure for a sub-shaft for guiding a movement of the optical pickup unit in the feeding base according to an embodiment of the present invention.

FIG. 11 shows a structure for the sub-shaft for guiding a movement of the optical pickup unit in the feeding base according to an embodiment of the present invention.

The sub-shaft 110 may be formed by performing press processing on the internal boundary of the second long-side portion on the other side of the first long-side portion on which the main shaft 170 is mounted in the rectangular rim shape of the feeding base 10 in a bent form. The main shaft coupling unit 310 and sub-shaft coupling unit 320 of the optical pickup unit 30 may be inserted into the main shaft 170 and the sub-shaft 110. The feeder 330 may be coupled to the lead screw 420 so the optical pickup unit 30 may be installed within the feeding base 10 of the rectangular rim shape. The feeder 330 engaged with the lead screw 420 rotated by the rotary force of the stepping motor 410 performs a straight-line movement, so the optical pickup unit 30 can be moved in the inner and outer circumferential direction.

An element for fixing the sub-shaft or taking the location of the sub-shaft is not necessary because the sub-shaft 110 is not formed using a separate part.

Figure 12:
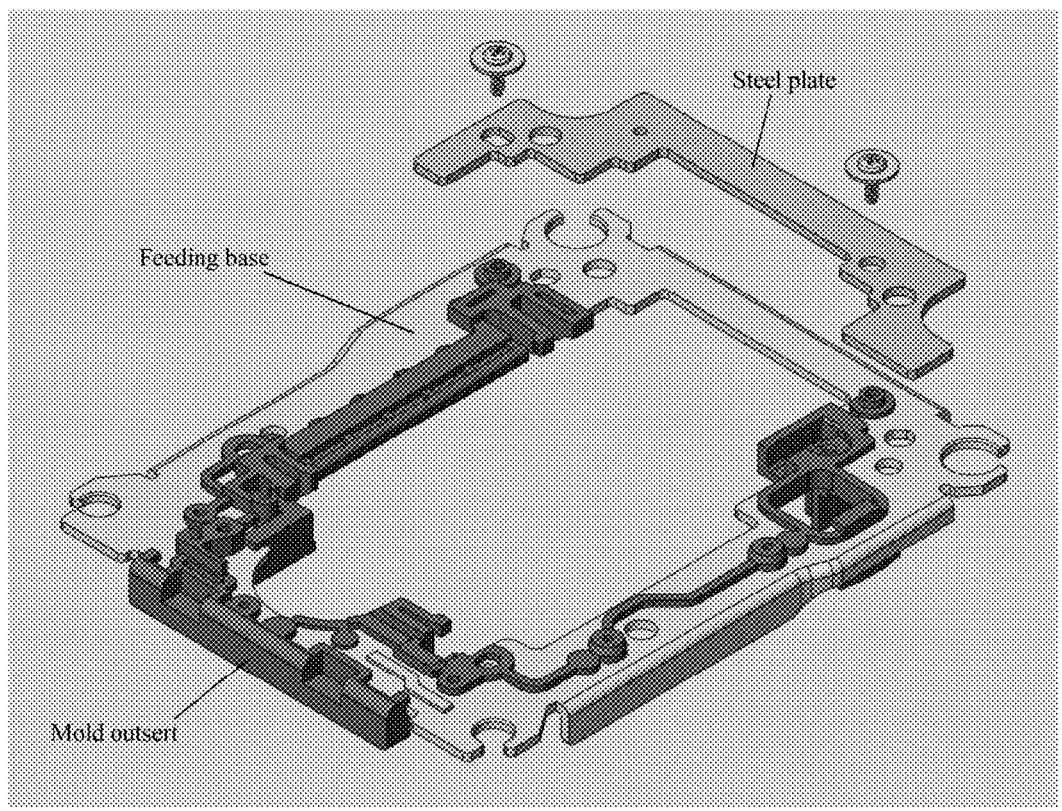
FIG. 12 shows a structure for overlapping a steel plate with an outer circumference in order to improve vibration in the feeding base of the conventional outsert mold type.
Figure 13:
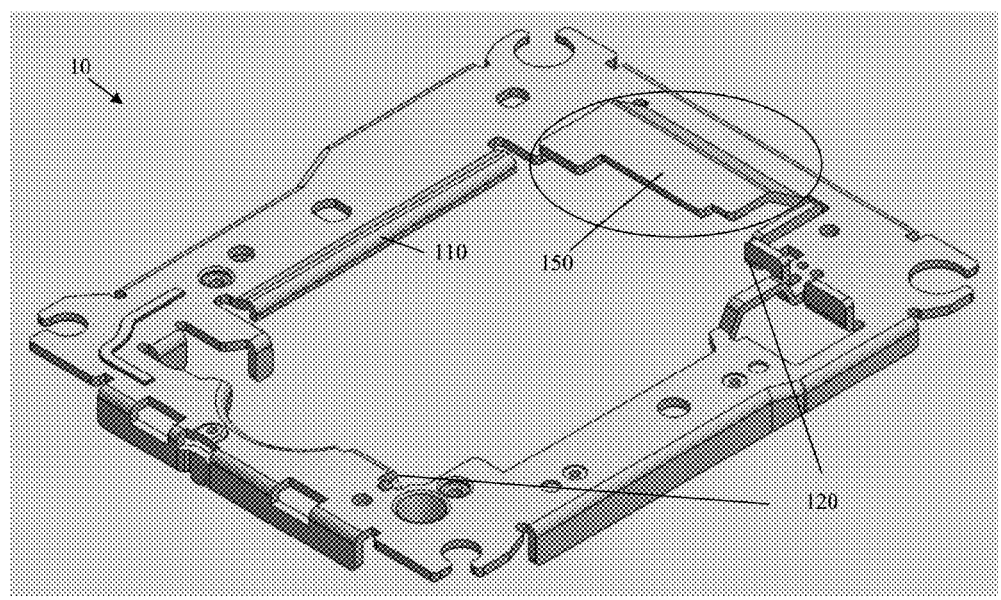
FIG. 13 shows an outer circumference bent unit in order to improve vibration in the feeding base according to an embodiment of the present invention.

FIG. 12 shows a structure for overlapping a steel plate with the outer circumference in order to improve vibration in the feeding base of the conventional outsert mold type, and FIG. 13 shows an outer circumference bent unit in order to improve vibration in the feeding base according to an embodiment of the present invention.

In the rectangular rim shape of the feeding base 10, no part is installed in the outer circumference portion, and the width of the outer circumference portion is narrow in order to reduce the size of the feeding base. Accordingly, stiffness may become weak, and high-frequency vibration may be generated because vibration is not suppressed when an optical disc is rotated at high speed. In order to solve such problems, in a prior art, a steel plate overlaps the outer circumference portion in order to increase the natural frequency of the feeding base 10 as shown in FIG. 12.

The vibration characteristic of the feeding base 10 can be improved by forming an outer circumference bent unit 150 in such a manner that the inside boundary of the outer circumference portion in the rectangular rim shape of the feeding base 10 is extended toward the inner circumference, but is bent in two stages so that it does not interfere with the optical pickup unit 30 that has moved toward the outermost circumference. The outer circumference bent unit 150 may be bent toward the upper side (or at a specific angle between the upper side and the inside) along the bent line provided in a tangential direction in the inside boundary of the outer circumference portion of the rectangular rim shape and may be bent toward the inner circumference again in the height that does not interfere with the outermost portion of the optical pickup unit 30. In this case, the protruded end portion of the bent portion of the outer circumference bent unit 150 may be extended in the inner circumferential direction up to the location where it does not collide against the edge of an optical disc seated in the turntable of the spindle motor 210 without covering the object lens 340 of the optical pickup unit 30 that has moved to the outermost circumference.

Accordingly, the optical disc drive can have the simplest structure, and thus price competitiveness of the optical disc drive can be secured using a minimum number of parts without using separate parts.

Furthermore, quality control becomes easy because the feeding base is configured by only press processing for a SECC steel plate and thus a dimension variation distribution of major function portions is small in the mass production of the feeding base.

The aforementioned embodiments of the present invention have been disclosed for illustrative purposes, and those skilled in the art may improve, change, replace, or add various other embodiments without departing from the technical spirit and scope of the present invention disclosed in the attached claims.

What is claimed is:

1. A feeding base of an optical disc drive, which is coupled to a spindle motor base on which a spindle motor for rotating an optical disc has been mounted, which is coupled to a stepping motor base on which a stepping motor for moving an optical pickup unit in inner and outer circumferential directions has been mounted, and on which a main shaft and a sub-shaft for guiding the inner and outer circumferential movements of the optical pickup unit are mounted,
   wherein the feeding base is made of a steel plate of a rectangular rim shape having an empty center corresponding to a space in which the optical pickup unit moves,
   wherein the feeding base comprises two guides for guiding a coupling location of the spindle motor base, and
   wherein at least first guide of the two guides is formed by protruding the steel plate to form a funnel shape such that a side cross section of the at least first guide has a slope section corresponding to a cone and a straight-line section corresponding to a cylinder.

2. The feeding base of claim 1, wherein part of the steel plate is bent to form a second guide of the two guides.

3. The feeding base of claim 2, wherein:
   the bent portion of the second guide comprises two portions having different widths in the inner and outer circumferential directions, and
   a stepped slope is formed between the two portions.

4. The feeding base of claim 1, wherein the sub-shaft is formed by processing part of the steel plate of the rectangular rim shape in a bending form.

5. The feeding base of claim 1, wherein an inside boundary of an outer circumference portion of a short side on which the spindle motor base has not been mounted in the rectangular rim shape is protruded toward the inner circumference in a state in which the inside boundary has been bent in such a way as not to interfere with the optical pickup unit which has moved to an outermost circumference.

6. An optical disc drive, comprising:
   a spindle motor base on which a spindle motor for rotating an optical disc has been mounted;
   an optical pickup unit for recording data on the optical disc or playing back data recorded on the optical disc;
   a stepping motor base on which a stepping motor for moving the optical pickup unit in inner and outer circumferential directions has been mounted;
   a main shaft and sub-shaft for guiding the inner and outer circumferential movements of the optical pickup unit; and
   a feeding base on which the spindle motor base, the stepping motor base, the main shaft, and the sub-shaft are mounted, for providing a moving space of the optical pickup unit,
   wherein the feeding base is made of a steel plate of a rectangular rim shape having an empty center corresponding to a space in which the optical pickup unit moves,
   wherein the feeding base comprises two guides for guiding a coupling location of the spindle motor base, and
   wherein at least first guide of the two guides is formed by protruding the steel plate to form a funnel shape such that a side cross section of the at least first guide has a slope section corresponding to a cone and a straight-line section corresponding to a cylinder.

7. The optical disc drive of claim 6, wherein:
part of the steel plate is bent to form a second guide of the two guides,
the bent portion of the second guide comprises two portions having different widths in the inner and outer circumferential directions, and
a stepped slope is formed between the two portions.

8. The optical disc drive of claim 6, wherein the sub-shaft is formed by processing part of the steel plate of the rectangular rim shape in a bending form.

9. The optical disc drive of claim 6, wherein an inside boundary of an outer circumference portion of a short side on which the spindle motor base has not been mounted in the rectangular rim shape is protruded toward the inner circumference in a state in which the inside boundary has been bent in such a way as not to interfere with the optical pickup unit which has moved to an outermost circumference.

10. The optical disc drive of claim 6, wherein:
the spindle motor base comprises two assembly holes corresponding to the two guides and a plurality of screw holes into which a plurality of screws for coupling the spindle motor base to the feeding base is inserted,
two screws of the plurality of screws couple the spindle motor base and the feeding base and adjust a height of the spindle motor base in a state in which springs have been respectively inserted into the two screws,
a first spring close to a place where the main shaft has been mounted comprises a coil portion and an extended portion, and
the extended portion supports the main shaft.

11. The optical disc drive of claim 10, wherein:
the coil portion of the first spring is fixed to a boss formed in the feeding base,
an end of the extended portion is fixed to the feeding base in a hook form,
part of the extended portion is bent twice, comes in contact with the main shaft, and provides an elastic force for fixing the main shaft to the feeding base in a tangential direction vertical to the inner and outer circumferential directions and in upward and downward directions.

* * * * *